US011239737B2

(12) United States Patent
Tao et al.

(10) Patent No.: US 11,239,737 B2
(45) Date of Patent: Feb. 1, 2022

(54) LINEAR VIBRATION MOTOR

(71) Applicant: AAC Technologies Pte. Ltd., Singapore (SG)

(72) Inventors: Feng Tao, Shenzhen (CN); Fanghua Ling, Shenzhen (CN); Junsheng Wang, Shenzhen (CN); Xiaofeng Pu, Shenzhen (CN)

(73) Assignee: ACC Technologies Pte. Ltd., Singapore (SG)

( * ) Notice: Subject to any disclaimer, the term of this patent is extended or adjusted under 35 U.S.C. 154(b) by 167 days.

(21) Appl. No.: 16/533,796

(22) Filed: Aug. 7, 2019

(65) Prior Publication Data

US 2020/0052566 A1 Feb. 13, 2020

(30) Foreign Application Priority Data

Aug. 13, 2018 (CN) .......................... 201821302285.4

(51) Int. Cl.
*H02K 33/16* (2006.01)
*B06B 1/04* (2006.01)

(52) U.S. Cl.
CPC .............. *H02K 33/16* (2013.01); *B06B 1/045* (2013.01)

(58) Field of Classification Search
CPC ............ H02K 33/16; B06B 1/04; B06B 1/045
USPC .......................................................... 310/15
See application file for complete search history.

(56) References Cited

U.S. PATENT DOCUMENTS

| 2011/0089772 | A1* | 4/2011 | Dong | ..................... | H02K 33/16 310/25 |
| 2016/0013710 | A1* | 1/2016 | Dong | ..................... | H02K 33/16 310/25 |
| 2017/0012516 | A1* | 1/2017 | Xu | .......................... | H02K 11/30 |
| 2017/0033672 | A1* | 2/2017 | Xu | .......................... | H02K 33/16 |
| 2017/0373577 | A1* | 12/2017 | Huang | ..................... | H02K 1/34 |

(Continued)

FOREIGN PATENT DOCUMENTS

| CN | 104725594 | * | 6/2015 |
| CN | 108023456 | * | 5/2018 |

OTHER PUBLICATIONS

Wang, Machine Translation of CN108023456, May 2018 (Year: 2018).*
Liu, Machine Translation of CN104725594, Jun. 2015 (Year: 2015).*

*Primary Examiner* — Quyen P Leung
*Assistant Examiner* — Eric Johnson
(74) *Attorney, Agent, or Firm* — W&G Law Group

(57) ABSTRACT

The present disclosure provides a linear vibration motor. The linear vibration motor comprises a shell having a housing space, a vibration unit housed in the housing space, an elastic member suspending the vibration unit in the housing space, and a driving unit driving the vibration unit to vibrate. The vibration unit comprises a housing portion recessed inwardly on two sides perpendicular to the vibration direction. The housing portion includes respective inner walls constituting the housing portion. The linear vibration motor further includes a blocking piece housing in the housing portion and fixedly connected to the inner wall, and a foamed cotton fixedly connected to the blocking piece and at least partially received in the housing portion, the blocking piece carrying and supporting the foamed cotton, and the blocking piece cooperating with the foamed cotton to limit the displacement of the vibration unit in the vibration direction.

5 Claims, 5 Drawing Sheets

(56) References Cited

U.S. PATENT DOCUMENTS

2017/0373578 A1\* 12/2017 Wu .......................... H02K 5/24
2018/0026511 A1\* 1/2018 Akanuma .............. H02K 33/16
                                                         310/20

\* cited by examiner

LINEAR VIBRATION MOTOR

FIELD OF THE DISCLOSURE

The present disclosure relates to vibration motors, and more particularly to linear vibration motors.

DESCRIPTION OF RELATED ART

A linear vibration motor is a device that converts electrical energy into mechanical energy by using the principle of electromagnetic force generation, and the linear vibration motor is usually installed in a portable mobile device to generate vibration feedback, such as vibration of a mobile phone or vibration feedback of a game player.

In the related art, the linear vibration motor comprises a shell having a housing space, a vibration unit housed in the housing space, an elastic member for suspending the vibration unit in the housing space, and a driving unit for driving the vibration unit to vibrate. The vibration unit comprises a mass block accommodated in the housing space and a magnetic assembled with the mass block. In order to control the vibration range of the vibration unit, a plurality of foamed cotton is usually fixed on the mass block to improve the response.

However, fixing the foamed cotton on the mass block in the related art not only increases the process difficulty of the mass block, but also increases the manufacturing cost, and the finished product yield is low.

Therefore, it is desired to provide a linear vibration motor to overcome the aforesaid problems.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
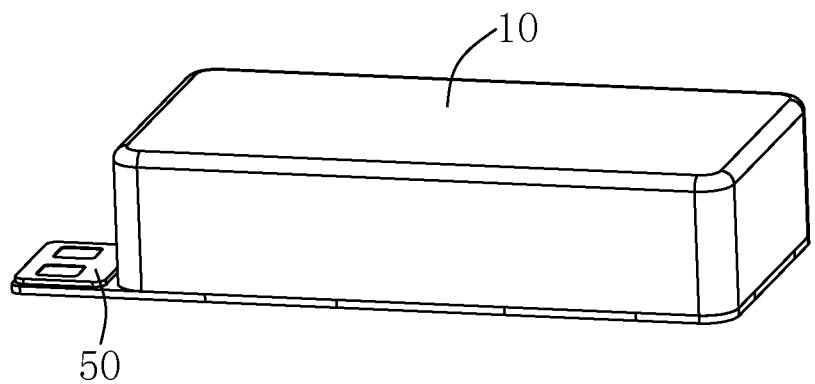
FIG. 1 is a three-dimensional structure diagram of a linear vibration motor of a preferred embodiment of the present disclosure.
Figure 2:
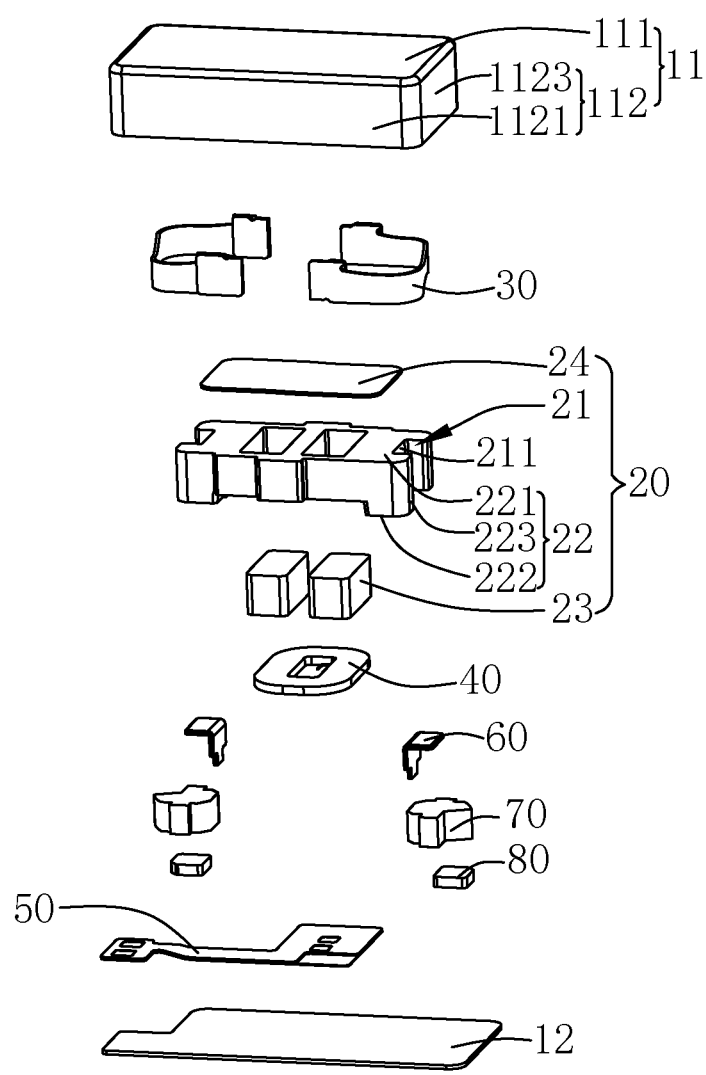
FIG. 2 is a diagram exploded view of the linear vibration motor shown in FIG. 1.
Figure 3:
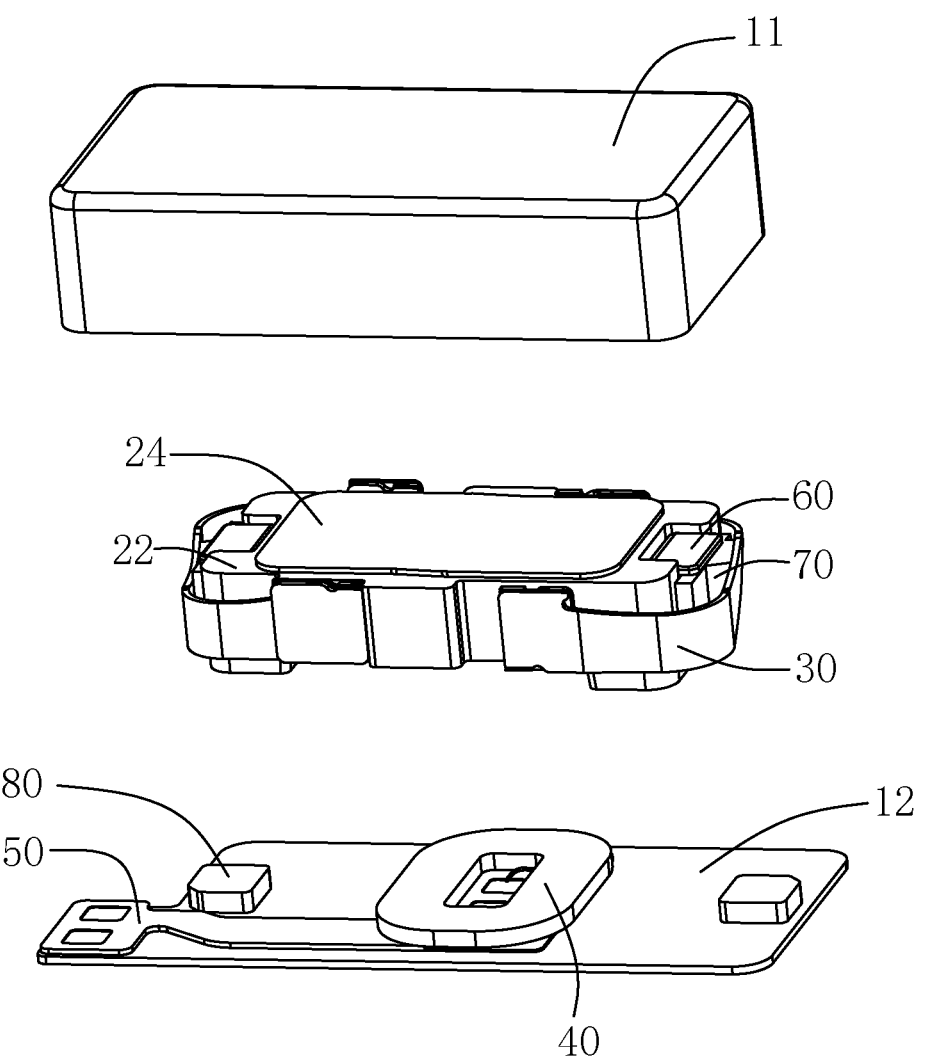
FIG. 3 is a partial exploded structural diagram of the linear vibration motor shown in FIG. 2.

Please also refer to FIG. 1 to FIG. 3, wherein FIG. 1 is a schematic diagram of the three-dimensional structure of the linear vibration motor of the present disclosure, FIG. 2 is a decomposition structure diagram of the linear vibration motor shown in FIG. 1, and FIG. 3 is a partial decomposition structure diagram of the linear vibration motor. The present disclosure provides a linear vibration motor 100, which comprises a shell 10 having a housing space, a vibration unit 20 housed in the housing space, an elastic member 30 for suspending the vibration unit 20 in the housing space, a driving unit 40 for driving the vibration unit 20 to vibrate, a flexible circuit board 50 electrically connected to the driving unit 40, a blocking piece 60 fixedly connected to the vibration unit 20, and a foamed cotton 70 fixedly connected with the blocking piece 60.

The shell 10 comprises a frame 11 and a cover 12 that is disposed on the frame 11 to enclose the housing space.

The frame 11 comprises a bottom wall 111 and a sidewall 112 surrounding the circumferential side of the bottom wall 111. The frame 11 is a rectangular parallelepiped structure having an opening, and the bottom wall 111 is arranged at parallel intervals with the cover 12. In this embodiment, the frame 11 is a square shell with an opening at one end. The sidewall 112 comprises two long sidewalls 1121 opposite to each other and two short sidewalls 1123 opposite to each other too, and the two ends of the short sidewalls 1123 respectively connected to the two ends of the long sidewalls 1121. The long sidewalls 1121 and the short sidewalls 1123 intersect end to end to form the sidewall 112.

There maintains two housing portions 21 recessing from the vibration unit 20 inwardly along both sides perpendicular to the vibration direction, and the vibration unit 20 further includes a mass block 22 suspending in the housing space, a magnetic 23 assembled on the mass block 22, and a pole 24 attached to the magnetic 23.

The housing portion 21 is disposed on the mass block 22, and the housing portion 21 recessing inwardly from the outer surface of the mass block 22. Specifically, the mass block 22 comprises a first surface 221 away from the cover 12, a second surface 222 disposed opposite to the first surface 221, and a third surface connecting the first surface 221 and the second surface 222 and facing the short sidewall 1123. The housing portion 21 is recessed from the third surface 223 toward away from the frame 11 and penetrates the first surface 221 and the second surface 222.

The housing portion 21 comprises a plurality of inner walls 211, the plurality of inner walls 2 enclosed in the housing portion 21. In this embodiment, the number of inner walls 211 is three, and the three inner walls 211 are arranged end to end and enclosed in U-shaped shape, and the opening of the U-shaped shape faces to the short sidewall 1123. Specifically, the housing portion 21 is provided with two, two of which are symmetrically arranged on the central axis of the width direction of the mass block 22.

One end of the elastic member 30 is fixedly connected with the sidewall 112, and the other end of the elastic member 30 is fixedly connected with the mass block 22. The elastic member 30 corresponds to the housing portion 21. More specifically, the two ends of the elastic member 30 are respectively provided with solder plates which are fixed to the sidewall 112 and the mass block 22 respectively in the form of welding.

The driving unit 40 is disposed adjacent to the side of the cover 12, and the driving unit 40 is disposed opposite to the magnet 23. In this embodiment, the driving unit 40 is a coil. When the coil is driven to be energized, the driving unit 40 exerts a force on the magnet 23, thereby driving the mass block 22 to vibrate.

The flexible circuit board 50 is fixed on the cover 12, and the flexible circuit board 50 is electrically connected with the driving unit 40.

Figure 4:
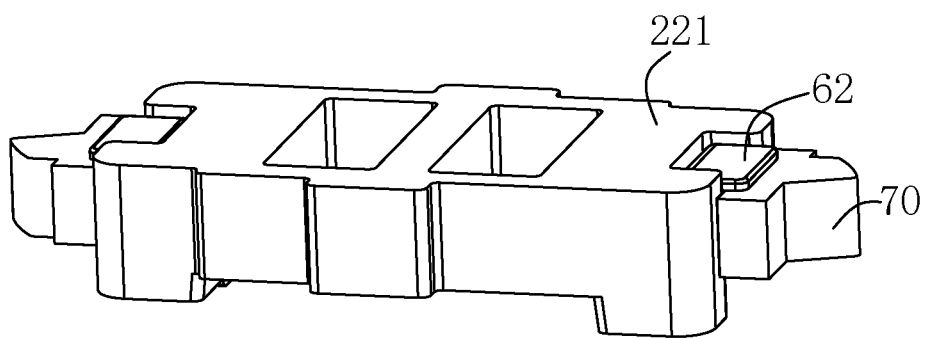
FIG. 4 is a diagram of the assembly structure of the components shown in FIG. 2.
Figure 5:
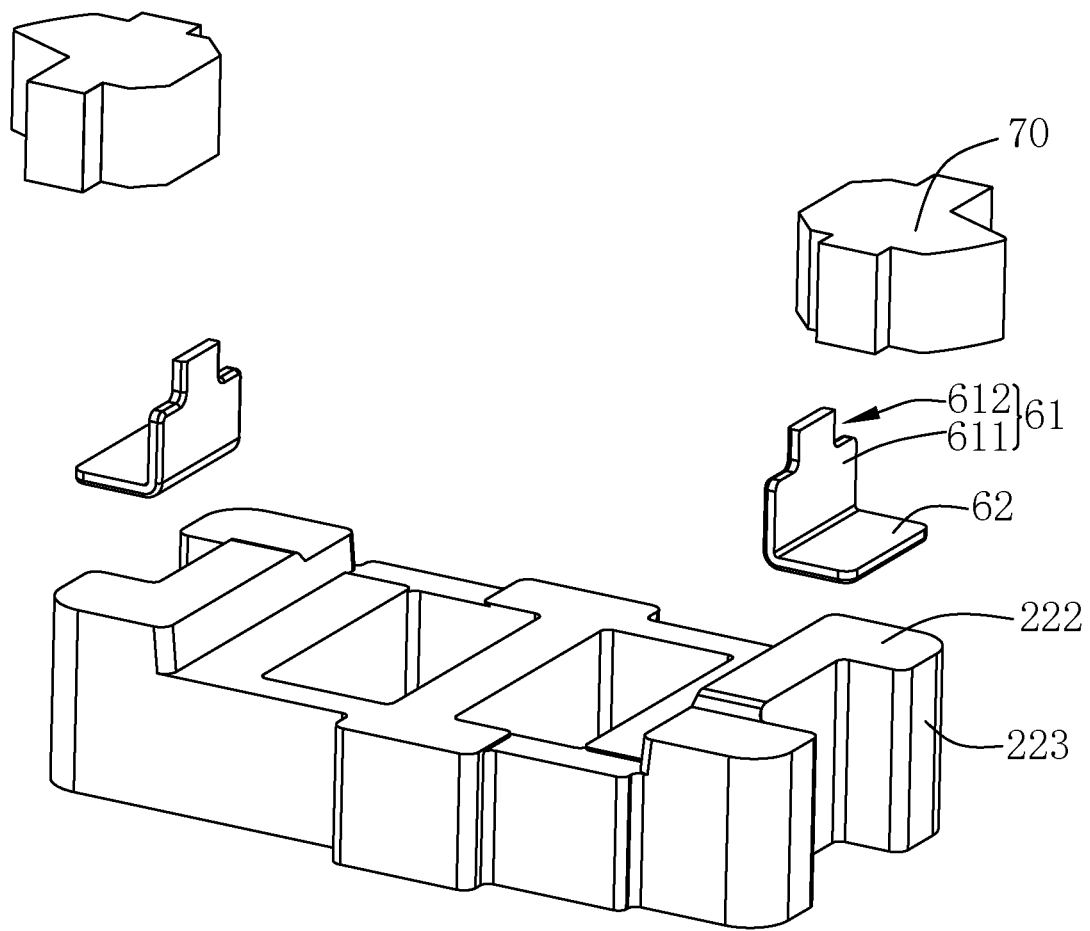
FIG. 5 is an exploded perspective view of another view portion assembly shown in FIG. 4.

Please refer to FIG. 4 and FIG. 5 together. The blocking piece 60 comprises a first portion 61 fixedly coupled to the inner wall 211 and a second portion 62 extending from an end of the first portion 61 in a direction perpendicular to a vibration direction of the vibration unit 20. The first portion 61 is perpendicular to the second portion 62, and the second portion 62 undertakes to support the foamed cotton 70 to cooperate to limit displacement of the vibration unit 20 in the vibration direction.

The first portion 61 has a rectangular shape. Specifically, the first portion 61 comprises a body portion 611 connected to the second portion 62 and a recess portion 612 recessed along the direction from one end of the body portion 611 away the second portion 62 toward the second portion 62. The body portion 611 is fixed to the inner wall 211 by welding, and the recess portion 612 is provided with two, and the two recess portions 612 are respectively located at two corners of the body portion 611. When the linear vibration motor 100 is assembled, the two recess portions 612 disposed on the body portion 611 can be used to avoid the gluing operation, thereby facilitating automatic rubberization.

The blocking piece 60 and the foamed cotton 70 are respectively provided with two, and the two blocking piece 60 and the two foamed cottons 70 are respectively disposed corresponding to the two housing portions 21. That is, one of the blocking piece 60 and the foamed cotton 70 are disposed on both sides of the mass block 22, so that the foamed cotton 70 on both sides of the mass block 22 can be uniformly applied without affecting the vibration of the vibration unit 20.

It can be understood that by adding the blocking piece 60 to fix the foamed cotton 70 in the present disclosure, it can be simplified for the shape of the mass block 22. The structure adjusts the injection molding process to a dry pressing process, thereby greatly reducing the manufacturing cost.

Preferably, the linear vibration motor 100 further includes a limiting block 80 disposed on the cover 12.

Compared with the related art, the linear vibration motor provided by the present disclosure is provided with the housing portion on the vibration unit, and the blocking piece is added in the housing portion for fixing the foamed cotton. The vibration unit vibrates for driving the foamed cotton to vibrate together, such that the blocking piece compresses the foamed cotton to provide mechanical damping; while the foamed cotton is supported by the blocking piece to make the vibration unit simplified, thereby reducing the manufacturing cost of the linear vibration motor, and the yield of the linear vibration motor is improved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibration motor, comprising:
a shell having a housing space;
a vibration unit, which is accommodated in the housing space;
an elastic member for suspending the vibration unit in the housing space;
a driving unit for driving the vibration unit to vibrate;
wherein the vibration unit further comprises two housing portions recessing inwardly from the both sides of the vibration unit in a direction that is perpendicular to the vibration direction, the housing portion comprises a plurality of inner walls which form the housing portion, the linear vibration motor further comprises a blocking piece accommodated in the housing space and fixedly connected with one of the plurality of inner walls, and a foamed cotton at least partial accommodated in the housing portion and fixedly connected with the blocking piece, the blocking piece undertakes to support the foamed cotton to cooperate to limit displacement of the vibration unit in the vibration direction;
the blocking piece comprises a first portion fixedly coupled to at least one of the plurality of inner walls and a second portion extending from an end of the first portion in a direction perpendicular to the vibration direction of the vibration unit, the first portion is perpendicular to the second portion, and the second portion undertakes and supports the foamed cotton, the first portion comprises a body portion connected to the second portion and a recess portion recessed along the direction from one end of the body portion toward the second portion, wherein the one end of the body portion is in a side away from the second portion;
there are two recess portions, and the two recess portions are respectively located at two corners of the body portion away from one end of the second portion.

2. The linear vibration motor as described in claim 1, wherein the first portion and one of the plurality of inner walls are fixed by welding.

3. The linear vibration motor as described in claim 1, wherein the vibration unit further includes a mass block suspended in the housing space and a magnet assembled on the mass block, the housing portion disposed on the mass block.

4. The linear vibration motor as described in claim 3, wherein the shell comprises a frame and a cover disposed on the frame, the mass block comprises a first surface away from the cover, a second surface disposed opposite to the first surface, and a third surface connecting the first surface and the second surface, the housing portion is recessed from the third surface away from the frame and penetrates the first surface and the second surface.

5. The linear vibration motor as described in claim 4, wherein there are two housing portions, which are symmetrically arranged on the central axis of the width direction of the mass block.

* * * * *